US011301099B1

(12) United States Patent
Shahsavari et al.

(10) Patent No.: US 11,301,099 B1
(45) Date of Patent: Apr. 12, 2022

(54) METHODS AND APPARATUS FOR FINGER DETECTION AND SEPARATION ON A TOUCH SENSOR PANEL USING MACHINE LEARNING MODELS

(71) Applicant: Apple Inc., Cupertino, CA (US)

(72) Inventors: Behrooz Shahsavari, Hayward, CA (US); Hojjat Seyed Mousavi, Santa Clara, CA (US); Nima Ferdosi, San Jose, CA (US); Baboo V. Gowreesunker, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/833,394

(22) Filed: Mar. 27, 2020

Related U.S. Application Data

(60) Provisional application No. 62/907,461, filed on Sep. 27, 2019.

(51) Int. Cl.
G06F 3/044 (2006.01)
G06F 3/01 (2006.01)
G06F 3/042 (2006.01)

(52) U.S. Cl.
CPC ............ *G06F 3/0446* (2019.05); *G06F 3/012* (2013.01); *G06F 3/0421* (2013.01); *G06F 3/0445* (2019.05)

(58) Field of Classification Search
CPC .... G06F 3/0446; G06F 3/0421; G06F 3/0445; G06F 3/012
See application file for complete search history.

(56) References Cited

U.S. PATENT DOCUMENTS

| | | | |
|---|---|---|---|
| 5,483,261 | A | 1/1996 | Yasutake |
| 5,488,204 | A | 1/1996 | Mead et al. |
| 5,543,591 | A | 8/1996 | Gillespie et al. |
| 5,825,352 | A | 10/1998 | Bisset et al. |
| 5,835,079 | A | 11/1998 | Shieh |
| 5,880,411 | A | 3/1999 | Gillespie et al. |
| 6,061,177 | A | 5/2000 | Fujimoto |

(Continued)

FOREIGN PATENT DOCUMENTS

| | | |
|---|---|---|
| JP | 6-161661 A | 6/1994 |
| JP | 2000-163031 A | 6/2000 |
| JP | 2002-342033 A | 11/2002 |

OTHER PUBLICATIONS

Examiner's Answer to Appeal Brief received for U.S. Appl. No. 13/072,623, dated Feb. 19, 2016, 16 pages.

(Continued)

*Primary Examiner* — Bryan Earles
(74) *Attorney, Agent, or Firm* — Kubota & Basol LLP

(57) ABSTRACT

Finger detection and separation techniques on a multi-touch touch sensor panel can be improved using machine learning models (particularly for touch sensor panels with relatively low signal-to-noise ratio). In some examples, a machine learning model can be used to process an input patch to disambiguate whether the input patch corresponds to one contact or two contacts. In some examples, the machine learning model can be implemented using a neural network. The neural network can receive a sub-image including an input patch as an input, and can output a number of contacts. In some examples, the neural network can output one or more sub-image masks representing the one or more contacts.

21 Claims, 10 Drawing Sheets

(56) References Cited

U.S. PATENT DOCUMENTS

| | | | |
|---|---|---|---|
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,330,345 | B1 | 12/2001 | Russo et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,254,775 | B2 | 8/2007 | Geaghan et al. |
| 7,663,607 | B2 | 2/2010 | Hotelling et al. |
| 7,916,126 | B2 * | 3/2011 | Westerman .............. G06F 3/038 345/173 |
| 8,479,122 | B2 | 7/2013 | Hotelling et al. |
| 8,519,965 | B2 | 8/2013 | Cady et al. |
| 9,804,717 | B2 * | 10/2017 | Schropp, Jr. .......... G06F 3/0445 |
| 9,977,546 | B2 * | 5/2018 | Ningrat ................... G06F 3/041 |
| 10,289,239 | B2 | 5/2019 | Pahud et al. |
| 10,489,262 | B1 * | 11/2019 | Chintalapoodi .... G06F 11/3075 |
| 10,725,582 | B2 * | 7/2020 | Stevenson ........... G06F 3/04166 |
| 2001/0048753 | A1 | 12/2001 | Lee et al. |
| 2003/0063073 | A1 | 4/2003 | Geaghan et al. |
| 2005/0104867 | A1 | 5/2005 | Westerman et al. |
| 2005/0168460 | A1 | 8/2005 | Razdan et al. |
| 2006/0026521 | A1 | 2/2006 | Hotelling et al. |
| 2006/0097991 | A1 | 5/2006 | Hotelling et al. |
| 2006/0197753 | A1 | 9/2006 | Hotelling |
| 2007/0268269 | A1 | 11/2007 | Chang et al. |
| 2008/0309629 | A1 | 12/2008 | Westerman et al. |
| 2011/0169763 | A1 | 7/2011 | Westerman et al. |
| 2011/0175837 | A1 | 7/2011 | Westerman et al. |
| 2011/0210943 | A1 * | 9/2011 | Zaliva ................ G06F 3/04166 345/174 |
| 2012/0306800 | A1 * | 12/2012 | Westerman ............... G06T 7/11 345/173 |
| 2013/0016045 | A1 * | 1/2013 | Zhao ................... G06F 3/04883 345/173 |
| 2013/0176270 | A1 * | 7/2013 | Cattivelli .............. G06F 3/0488 345/174 |
| 2016/0012348 | A1 * | 1/2016 | Johnson ................. G06N 20/20 706/12 |
| 2017/0277367 | A1 | 9/2017 | Pahud et al. |
| 2018/0032170 | A1 * | 2/2018 | Shaik .................... G06F 3/0418 |
| 2019/0101996 | A1 | 4/2019 | Lawrence |

OTHER PUBLICATIONS

Final Office Action received for U.S. Appl. No. 13/072,618, dated Aug. 7, 2013, 7 pages.
Final Office Action received for U.S. Appl. No. 13/072,618, dated Sep. 25, 2014, 19 pages.
Final Office Action received for U.S. Appl. No. 13/072,623, dated Aug. 5, 2013, 9 pages.
Final Office Action received for U.S. Appl. No. 13/072,623, dated Sep. 18, 2014, 17 pages.
Lee et al., "A Multi-Touch Three Dimensional Touch-Sensitive Tablet", CHI'85 Proceedings, Apr. 1985, pp. 21-25.
Non-Final Office Action received for U.S. Appl. No. 11/818,475, dated Jul. 29, 2010, 12 pages.
Non-Final Office Action received for U.S. Appl. No. 13/072,618, dated Jan. 17, 2013, 11 pages.
Non-Final Office Action received for U.S. Appl. No. 13/072,618, dated Mar. 11, 2014, 27 pages.
Non-Final Office Action received for U.S. Appl. No. 13/072,623, dated Feb. 20, 2014, 14 pages.
Non-Final Office Action received for U.S. Appl. No. 13/072,623, dated Jan. 18, 2013, 12 pages.
Non-Final Office Action received for U.S. Appl. No. 13/072,623, dated May 10, 2018, 9 pages.
Notice of Allowance received for U.S. Appl. No. 11/818,475, dated Jan. 21, 2011, 10 pages.
Notice of Allowance received for U.S. Appl. No. 13/072,618, dated Feb. 23, 2016, 8 pages.
Notice of Allowance received for U.S. Appl. No. 13/072,623, dated Sep. 7, 2018, 8 pages.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

* cited by examiner

METHODS AND APPARATUS FOR FINGER DETECTION AND SEPARATION ON A TOUCH SENSOR PANEL USING MACHINE LEARNING MODELS

CROSS REFERENCE TO RELATED APPLICATION

This application claims the benefit under 35 U.S.C. 119(e) of U.S. Provisional Patent Application No. 62/907,461, filed Sep. 27, 2019 the contents of which are incorporated herein by reference in their entirety for all purposes.

FIELD OF THE DISCLOSURE

This relates generally to touch sensor panels, and more particularly to techniques for finger detection and separation on a touch sensor panel using machine learning models.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface. In some examples, a touch screen or touch sensor panel can detect touches by or proximity of multiple objects (e.g., one or more fingers or other touch objects), and such interactions can be used to perform various inputs using multiple objects. Such a touch screen or touch sensor panel may be referred to as a "multi-touch" touch screen or touch sensor panel, and may accept "multi-touch gestures" as inputs.

Capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). In some implementations, due in part to their substantial transparency, some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

BRIEF SUMMARY OF THE DISCLOSURE

This relates generally to techniques for finger detection and separation on a touch sensor panel (e.g., a multi-touch touch sensor panel with a signal-to-noise ratio less than a threshold) using machine learning models. In some examples, a machine learning model can be used to process an input patch to disambiguate whether the input patch corresponds to one contact or two contacts. In some examples, the machine learning model can be implemented using a neural network. The neural network can receive a sub-image including an input patch as an input, and can output a number of contacts (e.g., one contact or two contacts). In some examples, the neural network can output one or more sub-image masks representing the one or more contacts.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to techniques for finger detection and separation on a touch sensor panel (e.g., a multi-touch touch sensor panel with a signal-to-noise ratio less than a threshold) using machine learning models. In some examples, a machine learning model can be used to process an input patch to disambiguate whether the input patch corresponds to one contact or two contacts. In some examples, the machine learning model can be implemented using a neural network. The neural network can receive a sub-image including an input patch as an input, and can output a number of contacts (e.g., one contact or two contacts). In some examples, the neural network can output one or more sub-image masks representing the one or more contacts.

Figure 1A:
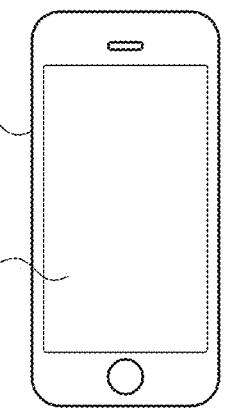
FIGS. 1A-1E illustrate touch sensing devices or systems that can include a touch screen or touch sensor panel according to examples of the disclosure.
Figure 1B:
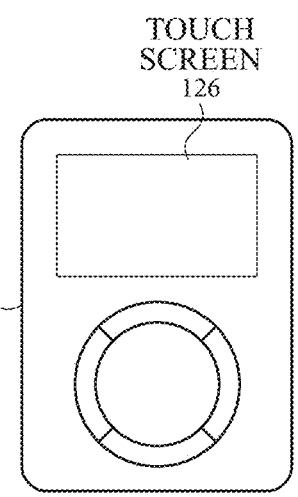
Figure 1C:
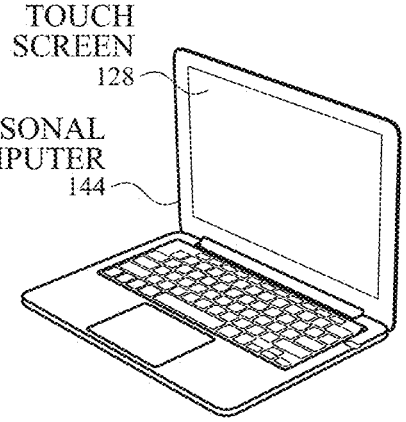
Figure 1D:
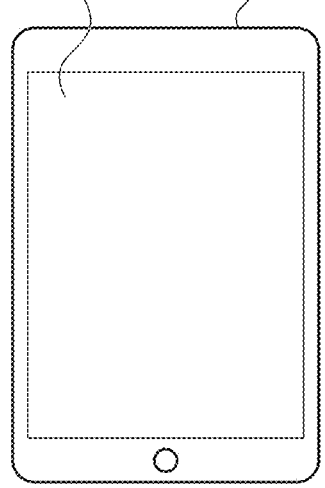
Figure 1E:
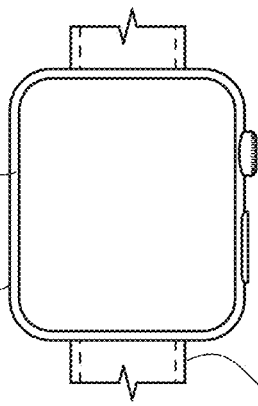

FIGS. 1A-1E illustrate touch sensing devices or systems that can include a touch screen or touch sensor panel according to examples of the disclosure. The touch screen or touch sensor panel can implement techniques for finger detection and separation using machine learning models. FIG. 1A illustrates an example mobile telephone 136 that can include a touch screen 124 according to examples of the disclosure. FIG. 1B illustrates an example digital media player 140 that can include a touch screen 126 and/or a touch sensor panel according to examples of the disclosure. FIG. 1C illustrates an example personal computer 144 that can include a touch screen 128 and a track pad with a touch sensor panel according to examples of the disclosure. FIG. 1D illustrates an example tablet computing device 148 that can include a touch screen 130 according to examples of the disclosure. FIG. 1E illustrates an example wearable device 150 that includes a touch screen 132 and can be attached to a user using a strap 152 according to examples of the disclosure. It is understood that a touch screen (which can include a touch sensor panel) or a touch sensor panel (without a touch screen, such as in a trackpad) can be implemented in other devices as well, and that the example systems of FIGS. 1A-1E can further include touch sensor panels on surfaces not shown in the figures. Touch screens 124, 126, 128, 130 and 132 can be multi-touch touch screens that can detect multiple objects.

In some examples, touch screens 124, 126, 128, 130 and 132 and touch sensor panels can be can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen or touch sensor panel can include a plurality of individual touch electrodes, each touch electrode identifying or representing a unique location (e.g., a touch node) on the touch screen or touch sensor panel at which touch or proximity is to be sensed, and each touch node electrode being electrically isolated from the other touch node electrodes in the touch screen/panel. Such a touch screen/panel can be referred to as a pixelated self-capacitance touch screen/panel, though it is understood that in some examples, the touch node electrodes on the touch screen/panel can be used to perform scans other than self-capacitance scans on the touch screen/panel (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen/panel. In some examples, the touch node electrodes of a self-capacitance based touch system can be formed from rows and columns of conductive material, and changes in the self-capacitance to ground of the rows and columns can be detected, similar to above. In some examples, a touch screen/panel can be multi-touch, single touch, projection scan, full-imaging multi-touch, capacitive touch, etc.

In some examples, touch screens 124, 126, 128, 130 and 132 and touch sensor panels can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen/panel. As described herein, in some examples, a mutual capacitance based touch system can form touch nodes from a matrix of small, individual plates of conductive material.

In some examples, touch screens 124, 126, 128, 130 and 132 or touch sensor panels can be based on mutual capacitance and/or self-capacitance. The electrodes can be arranged as a matrix of small, individual plates of conductive material (e.g., as in touch node electrodes 408 in touch screen/panel 402 in FIG. 4B) or as drive lines and sense lines (e.g., as in row touch electrodes 404 and column touch electrodes 406 in touch screen/panel 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
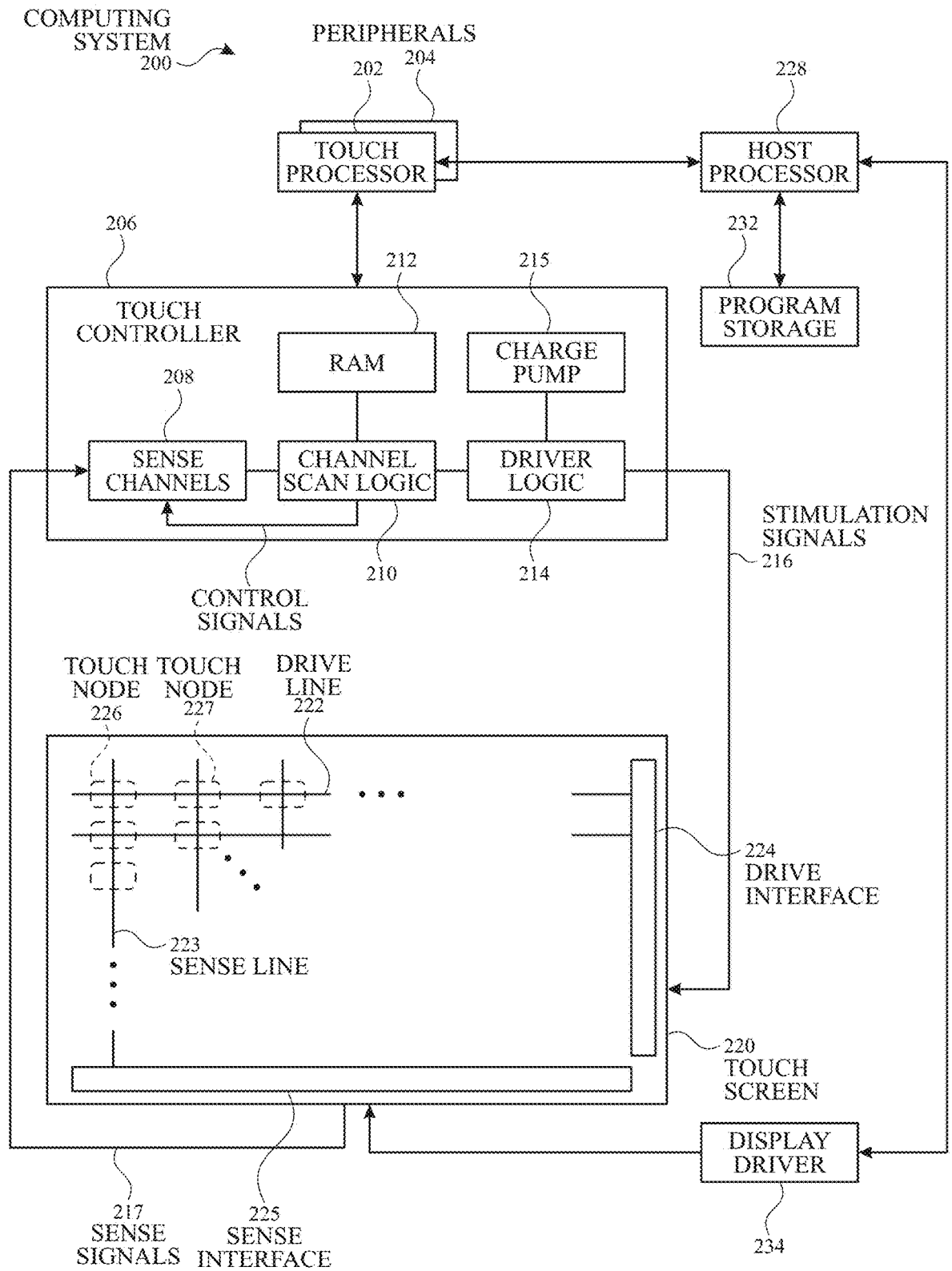
FIG. 2 illustrates a computing system including a touch screen according to examples of the disclosure.

FIG. 2 illustrates an example computing system including a touch screen according to examples of the disclosure, although it should be understood that the illustrated touch screen 220 (which includes a touch sensor panel) could instead be only a touch sensor panel. Computing system 200 can implement techniques for finger detection and separation using machine learning models. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself. The example computing system 200 of FIG. 2 can be configured to implement and perform any of the scans and comparisons described below.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described in this disclosure can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
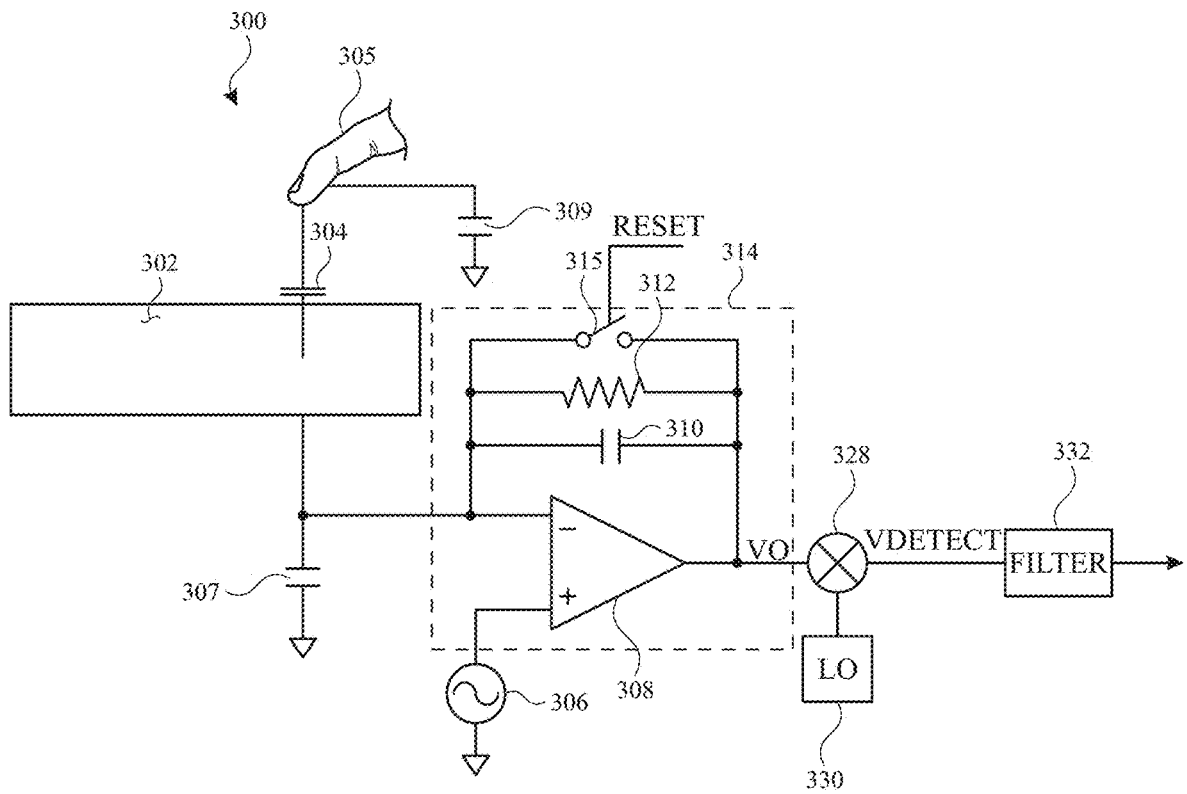
FIG. 3A illustrates a touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 (e.g., corresponding to a sense channel 208) according to examples of the disclosure. Touch node electrode 302 can correspond to a touch electrode 404 or 406 of touch screen/panel 400 or a touch node electrode 408 of touch screen/panel 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch screen/panel. Output 320 can be used by a processor to determine the presence of a proximity or touch event, or the output can be inputted into a discrete logic network to determine the presence of a proximity or touch event.

Figure 3B:
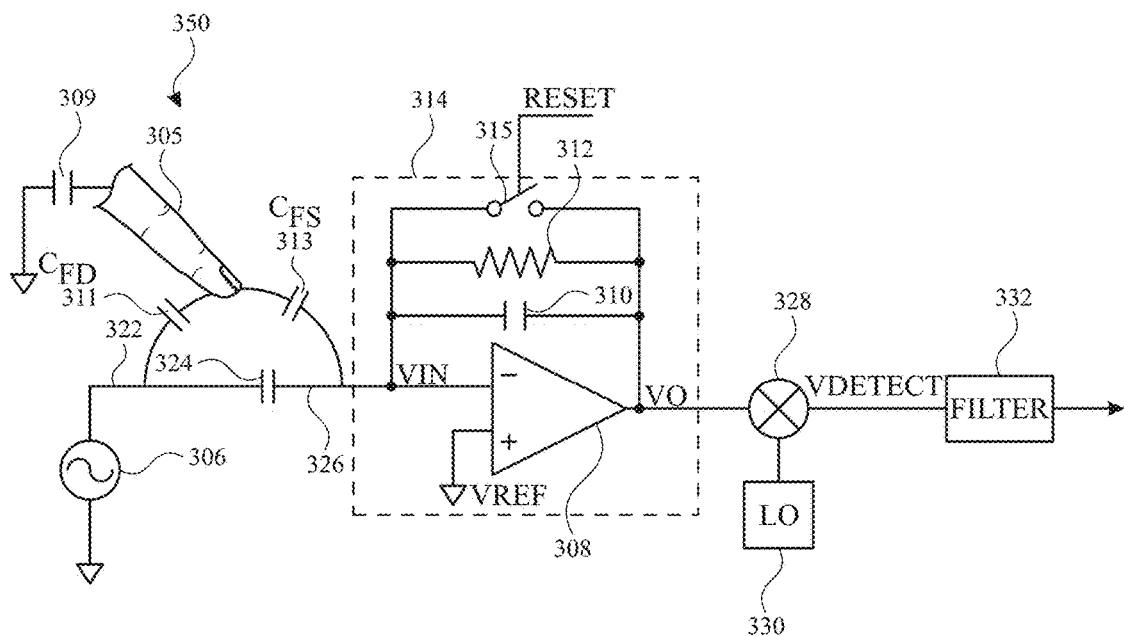
FIG. 3B illustrates a touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage $V_{ref}$. Operational amplifier 308 can drive its output to voltage $V_o$ to keep yin substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
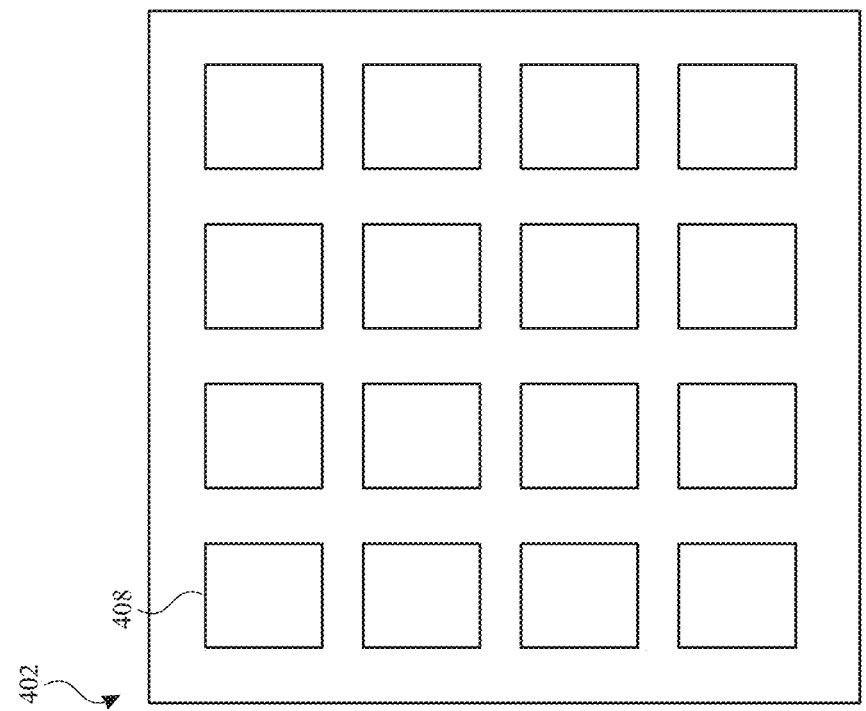
FIG. 4B illustrates a touch screen or touch sensor panel with touch node electrodes arranged in a pixelated touch node electrode configuration according to examples of the disclosure.
Figure 4A:
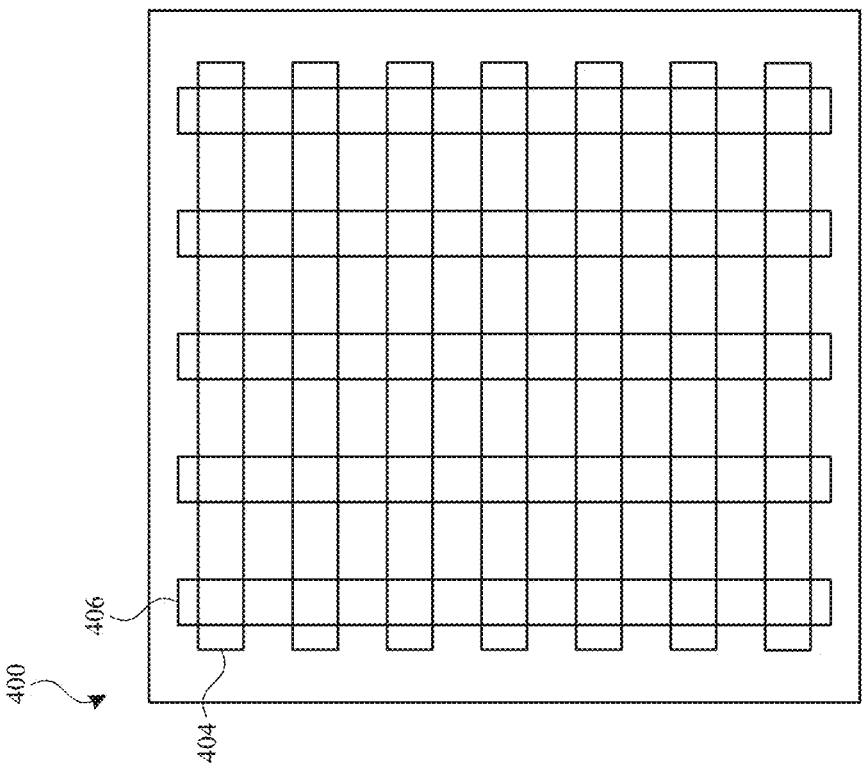
FIG. 4A illustrates a touch screen or touch sensor panel with touch electrodes arranged in rows and columns according to examples of the disclosure.

FIG. 4A illustrates a touch screen or touch sensor panel 400 with touch electrodes 404 and 406 arranged in rows and columns according to examples of the disclosure. Specifically, touch screen/panel 400 can include a plurality of touch electrodes 404 disposed as rows, and a plurality of touch electrodes 406 disposed as columns. Touch electrodes 404 and touch electrodes 406 can be on the same or different material layers on touch screen/panel 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen/panel 400 can sense the self-capacitance of touch electrodes 404 and 406 to detect touch and/or proximity activity on touch screen/panel 400, and in some examples, touch screen/panel 400 can sense the mutual capacitance between touch electrodes 404 and 406 to detect touch and/or proximity activity on touch screen 400.

FIG. 4B illustrates a touch screen or touch sensor panel 402 with touch node electrodes 408 arranged in a pixelated touch node electrode configuration according to examples of the disclosure. Specifically, touch screen/panel 402 can include a plurality of individual touch node electrodes 408, each touch node electrode identifying or representing a unique location on the touch screen/panel at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen/panel 402. In some examples, touch screen/panel 402 can sense the self-capacitance of touch node electrodes 408 to detect touch and/or proximity activity on touch screen/panel 402, and in some examples, touch screen/panel 402 can sense the mutual capacitance between touch node electrodes 408 to detect touch and/or proximity activity on touch screen/panel 402.

Figure 5:
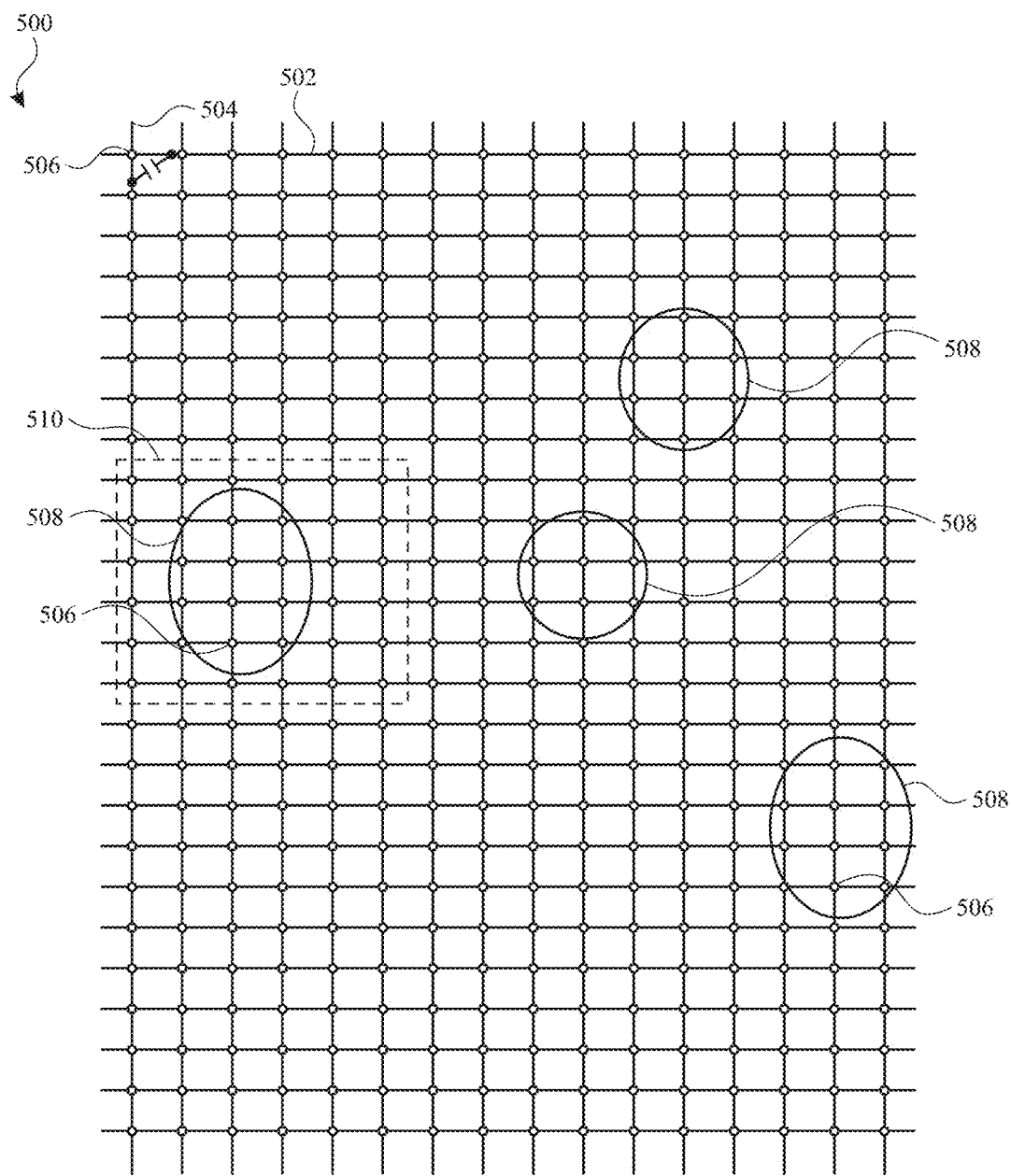
FIG. 5 illustrates a representation of an image of touch according to examples of the disclosure.

FIG. 5 illustrates a representation of an image of touch according to examples of the disclosure. Touch screen/panel 500 can include drive lines 502 and sense lines 504 arranged as a pattern of rows and columns, although other patterns can be possible. Touch nodes 506 can be formed at the intersection between drive lines 502 and sense lines 504, and the mutual capacitance (or change in mutual capacitance) therebetween can be measured. Touch screen/panel 500 can be a multi-touch touch screen/panel that can detect multiple touching or proximate objects. Each object touching or proximate to, but not touching, the touch screen/panel 500 can produce a touch signal at proximate touch nodes 506. By processing the touch image, touch signals from proximate touch nodes 506 (e.g., those touch signals meeting a threshold signal level) can be grouped together to form input patches 508. Thus, the input patches 508 can be regions within the image of touch corresponding to touch nodes 506 having signal values produced by an object touching (or proximate to, but not touching, in some examples) the touch screen/panel 500. The input patches identified in a touch image can be tracked through multiple successive touch images. Input patches from a corresponding object captured across multiple touch images can be assigned to a corresponding path. Assigning input patches to paths can allow for tracking gesture inputs (e.g., swipe, pinch, etc.). In some examples, the path can track the input contact from an initial touchdown on the touch-sensitive surface through a liftoff from the touch-sensitive surface. In some examples, the input patches of a path can be analyzed to identify movement of the input patch across one or more touch images and thereby track movement of an object corresponding to the input patches. Although a path can be used to identify movement, some paths may not include movement (e.g., when the input patch remains in the same position from touchdown to liftoff, such as in a tap). The tracking can include tracking position, velocities, and/or geometries (e.g., shape, number of touch nodes) of the input patches from various touch images corresponding to a path.

Although FIG. 5 illustrates distinct input patches 508 that may correspond to distinct objects (e.g., each of input patches 508 can correspond to one finger), in some examples, a segmentation process used to generate the input patches (e.g., a watershed algorithm—a bottom-up, ridge-hiking algorithm used to group pixels that are part of the same watershed around peak touch nodes) can cause a single object to appear as multiple input patches. In some examples, the multiple input patches can be merged for proper operation. For example, the merging can be based on a peak value of the input patches and a saddle value along the shared border. In some examples, as a result of the segmentation process, two proximate touch objects can appear as a single input patch, which may need to be separated for proper operation. For example, improper merging can cause a two-finger input/gesture (e.g., a pinch) to be detected as a single-finger input/gesture (e.g., a thumb contact). The ability to discriminate between a large contact (e.g., a thumb) and two proximate contacts (e.g., two-finger pinch) can be degraded, in some examples, particularly in capacitive sensing systems with relatively low signal-to-noise ratio (SNR).

Figure 6A:
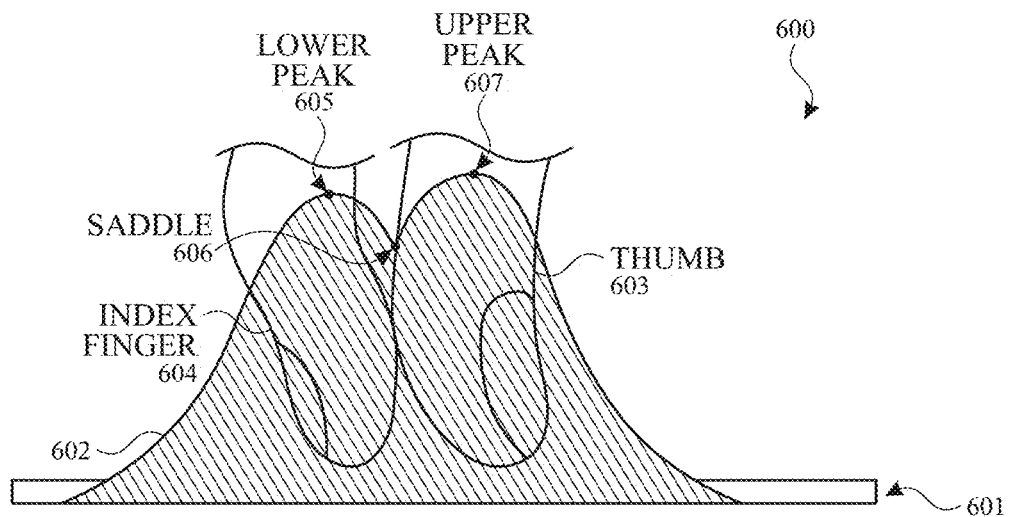
FIGS. 6A-6C illustrates signal profiles for different touch sensor panels according to examples of the disclosure.
Figure 6B:
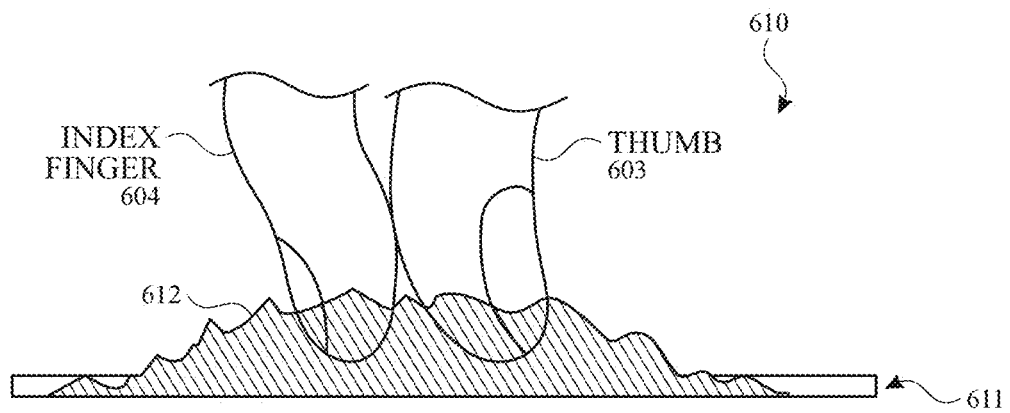
Figure 6C:
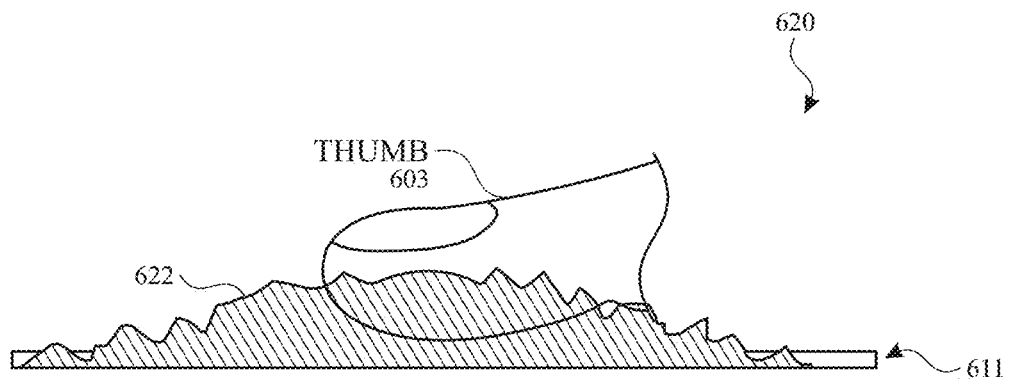

FIGS. 6A-6C illustrates signal profiles for different touch sensor panels according to examples of the disclosure. FIG. 6A illustrates view 600 of a one-dimensional signal profile 602 corresponding to a touch sensor panel 601 in response to contact (or proximity) of two fingers, such as thumb 603 and index finger 604. Due to the touch/proximity of the two fingers in the x-y plane of touch sensor panel 601, signal profile 602 can include two distinct peaks—lower peak 605 corresponding to index finger 604 and upper peak 607 corresponding to thumb 603—that partially overlap. A saddle point 606 can be formed between the two peaks. In some examples, the signal profile 602 can be detected as one input patch when the saddle point 606 is above the touch threshold to classify the signal as corresponding to a touch (or proximity) during input patch formation. In some examples, to avoid the combination of the two fingers into one input patch, the touch sensing system (e.g., touch processor 202) can determine whether to merge or separate the contacts based on saddle point 605 and one or more of peaks 605, 607. For example, the two peaks may be merged when the saddle point along their shared border is not "very deep". For example, when the magnitude of the touch signal at saddle point 606 is greater than a threshold (e.g., between 60%-90%,) of one (or more) of the two peak values (e.g., lower peak 605 or upper peak 607), the two peaks can be merged. When the magnitude of the touch signal at saddle point 606 is less than the threshold of one (or more) of the two peak values, the peaks can be separated into two input patches.

FIGS. 6B and 6C illustrate view 610 of a one-dimensional signal profile 612 corresponding to a touch sensor panel 611 in response to contact (or proximity) of two fingers (thumb 603 and index finger 604) and view 620 of a one-dimensional signal profile 622 corresponding to touch sensor panel 611 in response to contact (or proximity) of one finger (e.g., thumb 603). As illustrated by the comparison of FIG. 6A and FIGS. 6B-6C, signal profiles 612, 622 generated in response to one or two fingers in contact (or proximity) to touch sensor panel 611 can be reduced in magnitude compared with signal profile 602, and therefore touch sensor panel 611 may have a reduced signal-to-noise ratio (SNR) as compared with touch sensor panel 601. For example, touch sensor panels 601 and 611 may have different properties (different stimulation voltages, different touch electrode patterns, different stackup arrangements or thicknesses, different capacitive sensing type, etc.) that may cause the reduced SNR for signal profiles 612 and 622 for touch sensor panel 611 compared with signal profile 602 for touch sensor panel 601. Signal profiles 612 and 622 may not be distinguishable between a two-finger and one-finger contact using the saddle-peak algorithm described with respect to FIG. 6A.

In some examples, as described herein, a machine learning model (e.g., a deep learning model) can be used to disambiguate between an input patch caused by one-finger contact and input patch caused by two-finger contact. In some examples, the machine learning model can be used to disambiguate between an input patch caused by different numbers of fingers (e.g., disambiguate between 1, 2, or 3, etc.). This machine learning model may improve the disambiguation for the lower SNR touch sensor panel 611 and may even improve the disambiguation for the higher SNR touch sensor panel 601 (as compared with using the saddle-peak algorithm). In some examples, a touch sensor panel may use the saddle-peak algorithm when the SNR is above a threshold and use the machine learning model when the SNR is below a threshold (e.g., to save power and processing time, etc. when there is sufficient SNR). In some examples, SNR can be impacted by other factors than the touch sensor panel, such as external or internal noise aggressors, ungrounded user (e.g., increase in impedance between the user's finger and ground due to isolation between the user and ground), screen protectors, etc.

In some examples, the machine learning model can determine whether an input patch corresponds to one finger or corresponds to two-fingers (e.g., generating an output indicating whether the input patch corresponds to one or two fingers). In some examples, the determination can be that the input patch corresponds to a number of fingers other than 1 or 2 (e.g., 3 or more). In some examples, the machine learning model can also generate an output representative of the input patch(es). As described in more detail herein, in some examples, the machine learning model can accept as an input a sub-image including an input patch, and when the input patch corresponds to two objects, the output can include two output sub-image masks (annotated sub-images) representative of the two objects. In some examples, when the input patch corresponds to more than two objects, the output can include more than two output sub-image masks (e.g., three sub-image masks when the input patch corresponds to three objects, four sub-image masks when the input patch corresponds to four objects, etc.) These sub-image masks can be used for subsequent touch processing to determine input to the touch screen/panel and perform corresponding functions. For ease of description, disambiguation between one object versus two objects is a primary focus in some of the examples below.

In some examples, the input to the machine learning model can be a sub-image cropped from the touch image that includes an input patch. The sub-image can provide a two-dimensional input for disambiguation by the machine learning model, unlike the one-dimensional saddle-peak algorithm. Additionally, unlike the saddle-peak algorithm that uses a subset of the touch signals (corresponding to the saddle and the peak), the sub-image can include more or all of the touch signals for the input patch (and optionally some signals from outside the input patch along the perimeter of the input patch). Referring back to FIG. 5, a touch image can represent the intensity of touch signals at touch nodes 506 of touch screen/panel 500. In some examples, one or more input patches 508 can be identified and cropped to form or select sub-images for disambiguation using the machine learning model. For example, FIG. 5 includes dashed box 510 around one such input patch 508. The portion of the touch image corresponding to dashed box 510 can be the input sub-image cropped from the touch image. As illustrated in FIG. 5, a 6×6 sub-image can be cropped from 25×16 touch image (corresponding to 36 out of 400 touch nodes). More generally, the sub-image can be of size m×n cropped from a touch image of size M×N. In some examples, to simplify the machine learning model, the input sub-image can be a fixed size (e.g., m×n). Increasing the size of sub-image can increase the processing complexity of the machine learning model due to an increase in the amount of data represented in the larger sub-image. Using a uniform size sub-images can simplify the machine learning model by reducing processing variations across different sized input patches. In some examples, the size of the sub-image can be determined based on the pitch of the touch electrodes such that the area of the sub-image can correspond to the area of two fingers in contact with the touch sensor panel, such that the input patch can include a thumb or two fingers (e.g., the fingers illustrated in FIGS. 6A-6C). Generally, the size of the sub-image can be a function of the size of the touch nodes (the size and spacing) and the number of fingers to disambiguate between.

Figure 7:
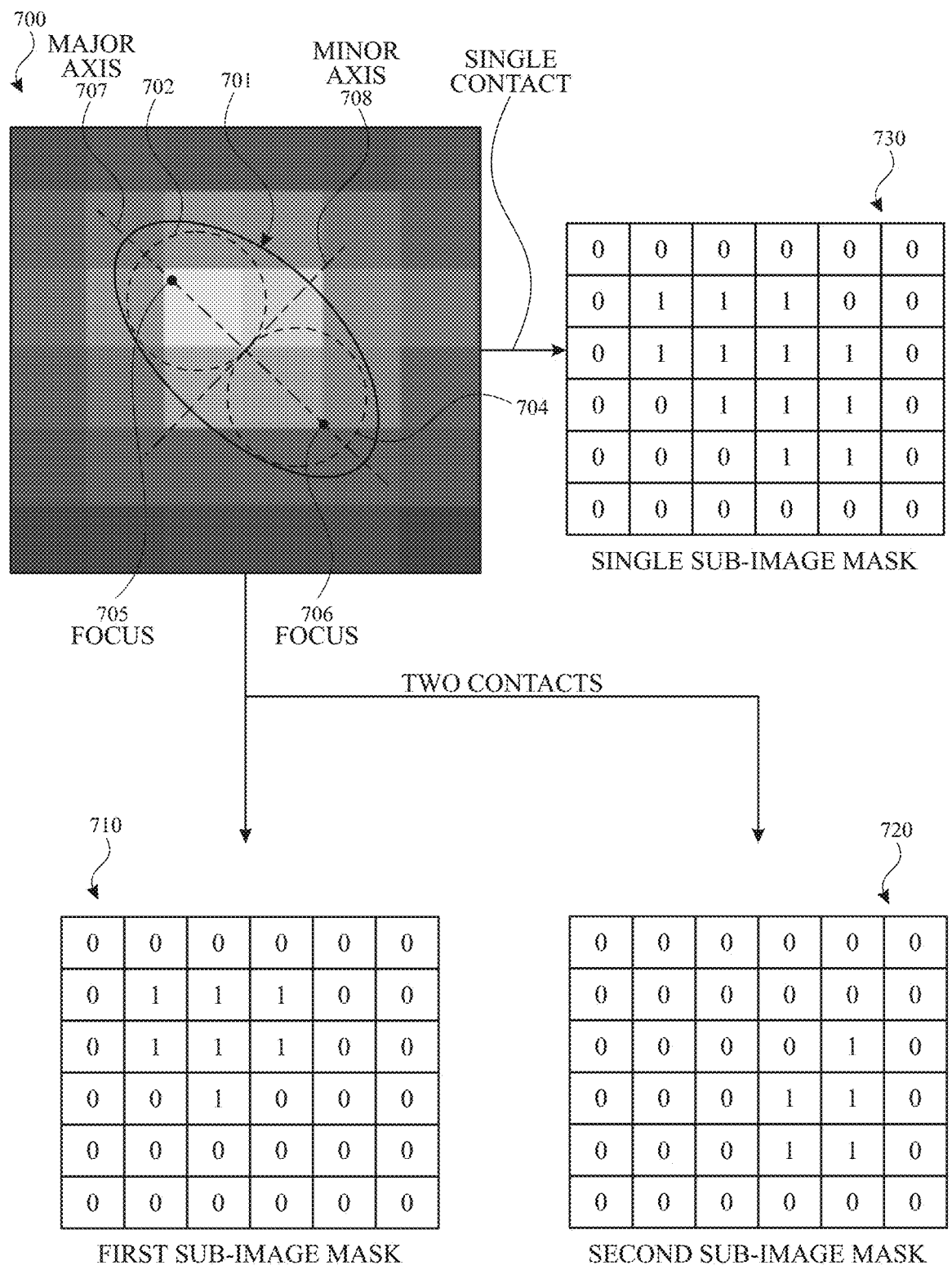
FIG. 7 illustrates an example input sub-image and example output sub-image masks according to examples of the disclosure.

FIG. 7 illustrates an example input sub-image and example output sub-image masks according to examples of the disclosure. Sub-image 700 can be a two-dimensional image cropped from the touch image. Sub-image 700 can be a greyscale image representing the intensity of the touch signal at the 6×6 (or more generally, m×n) touch nodes corresponding to the subsection of the touch nodes of the touch sensor panel. In the greyscale image, white can represent maximum intensity of a touch signal and black can represent minimum intensity (e.g., zero). Sub-image 700 can include an input patch corresponding to one finger 701 (indicated by solid line) or two fingers 702, 704 (indicated by dashed line). The machine learning model can be used to determine whether input sub-image 700 corresponds to a single contact (e.g., one finger) or two contacts (e.g., two fingers).

In some examples, when the sub-image 700 corresponds to two contacts, two sub-image masks can be generated (e.g., by the machine learning model or by other processing circuitry based on the number of contacts output by the machine learning model). For example, a first sub-image mask 710 and second sub-image mask 720 can be generated. The sub-image masks can be annotated images separately representing the first contact (e.g., from finger 702) and the second contact (e.g., from finger 704). In some examples, the output sub-image masks can be the same size as the input sub-image. For example, input sub-image 700 illustrated in FIG. 7 is of size 6×6 and output sub-image masks 710, 720 are also of size 6×6.

The sub-image masks can represent whether touch is detected or is not detected at the touch nodes corresponding to the input sub-image. For example, first sub-image mask 710 can represent with "1" those touch nodes including a touch signal greater than a threshold that correspond to a first object (e.g., finger 702) and can represent with "0" those touch nodes including a touch signal below the threshold or corresponding to the second object (e.g., finger 704). Likewise, second sub-image mask 720 can represent with "1" those touch nodes including a touch signal greater than the threshold that correspond to a second object (e.g., finger 704) and can represent with "0" those touch nodes including a touch signal below the threshold or corresponding to the first object (e.g., finger 702). Sub-image masks 710, 720 are shown as binary representations with "1" representing touch and "0" representing non-touch, but the sub-image masks may use different conventions or non-binary representations, in some examples. The representation of sub-image masks 710, 720 can allow for multiplying the respective sub-image mask with the input sub-image to derive an input patch for the corresponding object, in some examples. The sub-image masks can be mutually exclusive such that each of the touch nodes of the sub-image at which touch is detected is associated with only one of the first object or the second object. In some examples, the sub-image masks may not be mutually exclusive. For examples, the sub-image masks can represent a contribution (e.g., a probability value between 0-1) due to each respective object. For example, rather than representing a touch node with a "1" in a first sub-image mask corresponding to a first object and a "0" in a second sub-image mask corresponding to a second object, the example touch node can be represented with 36% (e.g., of the touch signal measured at the touch node) assigned to the first sub-image mask corresponding to the first object and can be represented with 64% (e.g., of the touch signal measured at the touch node) assigned to the second sub-image mask corresponding to the second object. The remaining touch nodes can similarly represent the respective contributions due to respective objects for its respective sub-image mask.

In some examples, when the sub-image 700 corresponds to one contact, one sub-image masks can be generated (e.g., by the machine learning model or by other processing circuitry based on the number of contacts output by the machine learning model). For example, sub-image mask 730 can be generated. The sub-image masks can be a binary annotated image including a "1" representative of those touch nodes including a touch signal greater than the threshold that correspond to finger 701 and a "0" representative of those touch nodes including a touch signal less than the threshold. In some examples, when the sub-image 700 corresponds to one contact, the input sub-image can be used for subsequent processing without generating sub-image mask 730.

In some examples, the machine learning model can generate sub-image mask(s) based on training the machine learning model. For example, the training data can include touch images with input sub-images including input patches corresponding to different one finger and two-finger inputs (e.g., vertical/flat or other orientations of index/thumb or other fingers, palms, loose/tight pinch with different pairs of fingers in different orientations), and corresponding annotated output sub-image mask(s) corresponding to the input sub-images. By virtue of the training (and using features of the images derived by the machine learning model), the machine learning model can estimate the touch nodes corresponding to the first object and the touch nodes corresponding to the second object in instances where two contacts are estimated.

In some examples, processing circuitry can divide the input patch in the input sub-image using an algorithm (e.g., without using machine learning for the separation, or providing the algorithm as a tool for the machine learning model). In some examples, when two contacts are estimated by the machine learning model, the processing circuitry can calculate or used previously calculated parameters for the input patch to divide the input patch into two contacts. Referring back to FIG. 7, the input patch can be parameterized, for example, by ellipse fitting. The ellipse fitting parameterization can generate parameters including some or all of foci 705, 706, major axis 707 and minor axis 708. In some examples, the input patch can be divided into two along the minor axis 708. In some examples, the major axis 707 may be parameterized and minor axis 708 can be derived as the line at the midpoint between foci 705, 706 and perpendicular to major axis 707.

Figure 8A:
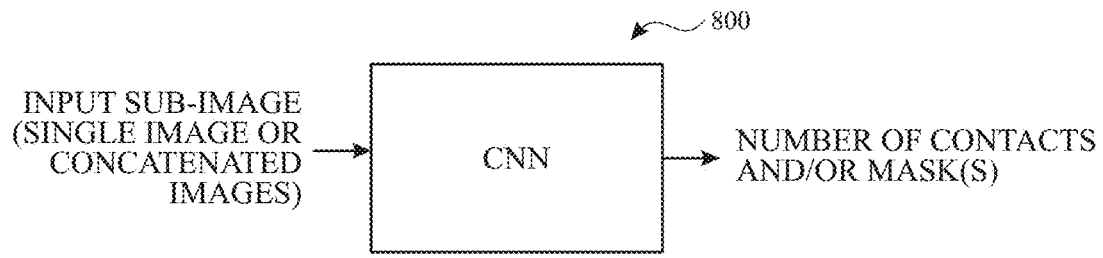
FIGS. 8A-8C illustrate example neural networks according to examples of the disclosure.
Figure 8B:
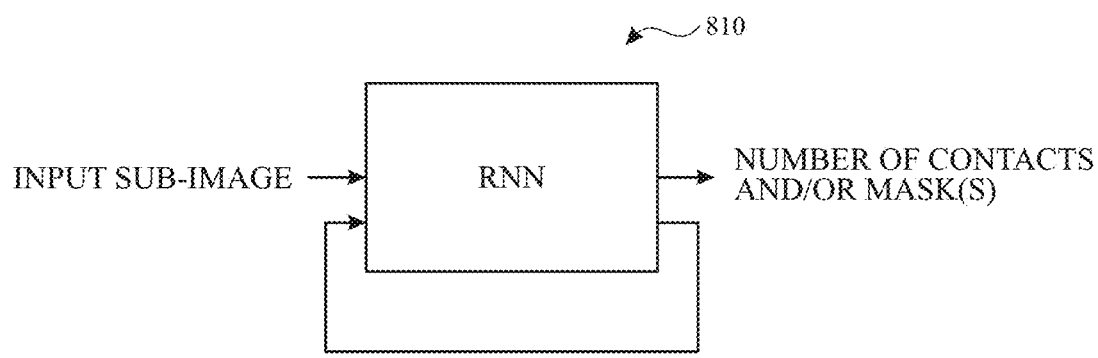
Figure 8C:
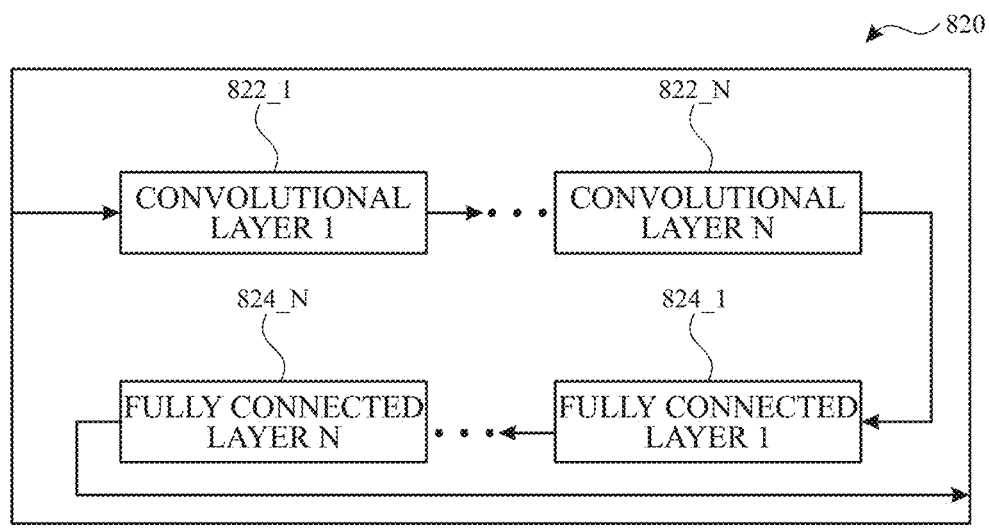

As described herein the machine learning model can be a deep learning model. In some examples, the learning model can be implemented using a neural network (e.g., machine learning processing circuit) including one or more convolutional layers. Additionally, in some examples, the neural network can optionally include one or more fully connected layers. FIGS. 8A-8C illustrate example neural networks according to examples of the disclosure. FIG. 8A illustrates a convolutional neural network (CNN) 800. CNN 800 can accept an input sub-image (e.g., corresponding to sub-image 700) and output an estimated number of contacts represented by the input patch in the sub-image. In some examples, the output of CNN 800 can be a probability that the input patch includes two fingers, and when the probability is above a threshold (e.g., 50%, 60%, etc.) the output can be an estimation that the input patch includes two fingers. In some examples, the output of CNN 800 can be a probability that the input patch includes one finger, and when the probability is above a threshold (e.g., 50%, 60%, etc.) the output can be an estimation that the input patch includes one finger. In some examples, the output of CNN 800 can be a probability distribution, estimating a probability that the input patch corresponds to a given number of contacts (e.g., 0, 1, 2, 3, 4, etc.), and the estimated number of contacts represented by the input patch in the sub-image can be the number with a highest probability value in the probability distribution. Additionally, as described above, in some examples, CNN 800 can optionally generate one or more sub-image masks depending on the number of estimated contacts corresponding to the input patch (e.g., sub-image masks 710, 720, 730).

In some examples, a temporal feature can be introduced for CNN 800. For example, rather than inputting one input sub-image, the input can be a plurality of input sub-images. For example, the current input sub-image (at t=0) can be concatenated with one or more previous input sub-images (e.g., at t−1, t−2, etc.) corresponding to the same input patch (e.g., same path) or the same region of the touch image. The machine learning model can receive the multi-sub-image input and can estimate the number of contacts corresponding to the input patch in the current sub-image based on the multiple sub-images. In such an implementation, the sub-images from one or more previous touch images can be stored, but no additional information may be required.

FIG. 8B illustrates a recurrent neural network (RNN) 810, which can include memory (internal states) to track information. For example, RNN 810 can receive an input sub-image in a similar manner as CNN 800, but additionally may receive feedback from the output of RNN 810, such as estimation of the number of contacts for the input patch (e.g., same path) in a one or more previous touch images and/or the corresponding sub-image mask(s). These feedbacks may be stored in internal states of RNN 810. In some examples, RNN can also store prior input sub-images in a similar manner as described above for the temporal feature of CNN 800. RNN 810 can output the number of contacts (e.g., optionally using a probability and threshold) and optionally generate one or more sub-image masks, as described above for CNN 800.

FIG. 8C illustrates an example neural network 820 that may be included as part of CNN 800 or RNN 810. Neural network 820 can include one or more convolutional layers (e.g., 822_1 to 822_N) and one or more fully connected layers (e.g., 824_1 to 824_N). In some examples, the neural network can include one or more convolutional layers without fully connected layers. In some examples, each of the convolutional layers can convolve the input to the convolutional layer with multiple filters. The multiple filters can include filter coefficients that may be set via training. Optionally, each of the convolutional layers can also include a non-linear function layer and/or down-sampling/pooling layer to implement non-linarites and/or simplify the feature set (e.g., change the resolution of the output) before processing by a subsequent layer. In some examples, the neural network for disambiguation can include 2-10 convolutional layers. In some examples, the neural network for disambiguation can include 3-5 convolutional layers. In some examples, the output of the one or more convolutional layers can be input to a classification layer. The classification layer can including a flattening later to generate the final feature set and a fully connected layer to map the features to the output classifications. The classification layer can make the decision on the number of contacts in the sub-image (region of interest). In some examples, the classification layer can include more than one fully connected layer. It is understood that neural network 820 is one example, but the neural network for disambiguation described herein can be achieved using fewer, more and/or different layers in the same or different configurations.

In some examples, the machine learning models can be stored in memory (e.g., RAM 212) and processing circuitry (e.g., touch processor 202) can be configured to implement the neural network (e.g., CNN 800, RNN 810, or other suitable machine learning network) stored in memory.

Figure 9:
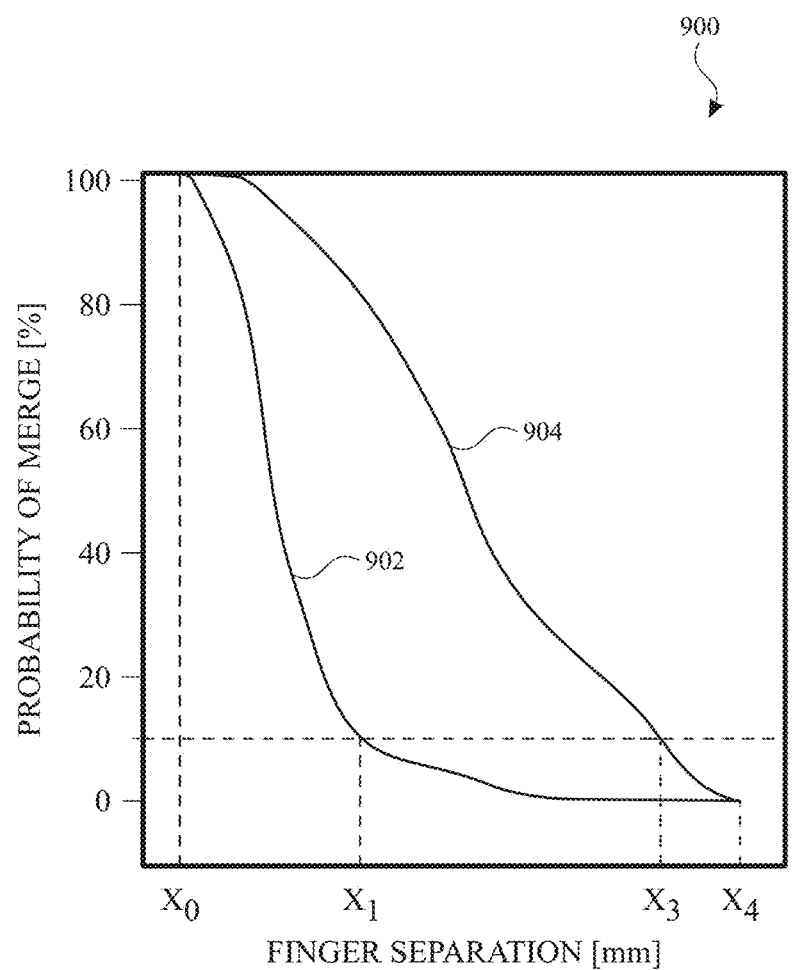
FIG. 9 illustrates a plot of disambiguation performance for a multi-touch touch sensor panel according to examples of the disclosure.

As described herein, using a machine learning model to estimate a number of contact can improve disambiguation between one-finger and two-finger inputs. FIG. 9 illustrates a plot of disambiguation performance for a multi-touch touch sensor panel using machine learning model for disambiguation and for a touch sensor panel using a different disambiguation technique (without machine learning). Plot 900 illustrates the probability of incorrectly merging two contacts as a function of the separation distance between the two contacts. Curve 902 illustrates the performance for a touch sensor panel with an SNR below a threshold (e.g., below 3, 3.5, 4, 4.5, 5 or some other SNR threshold) without using machine learning models and curve 904 illustrates the performance for the touch sensor panel using machine learning models. As illustrated by plot 900, the performance is improved for any distance between the convergence of the curves (e.g., between x0 and x3). As a result of better estimation of the number of contacts, the touch sensor panel can better disambiguate the input and perform the corresponding function for single or two-finger input. In some examples, the touch sensor panel can be designed to a specification that requires less than a threshold error rate (e.g., 1%, 5%, 10%, 20%, etc. for false positives of merging two contacts). With such a design specification, and a 10% error rate illustrated as an example in FIG. 9, using machine learning allows this specification to be met for separation distances greater than x1, whereas without machine learning this specification may be met for separation distances greater than x2, where x2 is greater than x1. For example, the design specification can be met using the machine learning model for touches separated by 10-18 mm (e.g., centroid to centroid), whereas the design specification may not be met when not using the machine learning model for two touches separated by such a range of distances (e.g., false positive merger may exceed the threshold error rate without the machine learning model). In some examples, the design specification can be met using the machine learning model for touches separated by 12-14 mm (e.g., centroid to centroid), whereas the design specification may not be met when not using the machine learning model for two touches separated by such a range of distances (e.g., false positive merger may exceed the threshold error rate without the machine learning model). As a result, using the machine learning model can improve the disambiguation for closer contacts.

Figure 10:
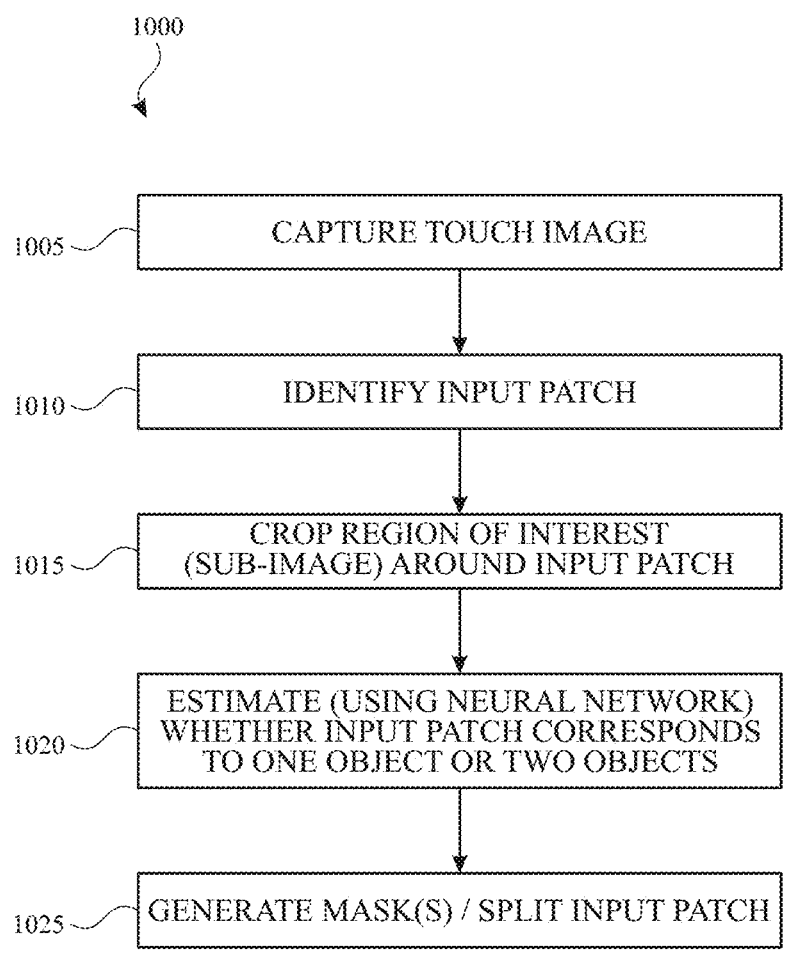
FIG. 10 illustrates an example process for disambiguation according to examples of the disclosure.

FIG. 10 illustrates an example process 1000 for disambiguation according to examples of the disclosure. At 1005, a touch image can be captured via a touch sensing scan (e.g., a mutual or self-capacitance touch sensing scan of the touch nodes of a touch screen/panel). At 1010, an input patch can be identified in the touch image (e.g., as described with respect to FIG. 5.) At 1015, the touch image can be cropped around the input patch identified at 1010 to form or select a region of interest (sub-image) for the disambiguation described herein. At 1020, the machine learning model (e.g., CNN 800, RNN 810, or other neural network) can estimate whether the input patch corresponds to one object or two objects. At 1025, optionally, the machine learning model or other processing circuitry can generate one or more masks. The number of masks may depend on the number of contacts estimated at 1020. In some examples, the generation of two masks can be based on splitting the input sub-image into two mutually exclusive masks. In some examples, the generation of two masks can be based on splitting the touch signal contribution in the input sub-image into two masks (e.g., non-mutually exclusive). In some examples, splitting the input patch can be achieved using parameters of the input patch (e.g., minor axis).

Although process 1000 describes disambiguation between one-contact input patch and a two-contact input patch, the processing at 1005-1025 can be repeated for multiple input patches (e.g., each input patch 508 identified in a touch image corresponding to touch screen/panel 500).

In some examples, the disambiguation can be bypassed when certain criteria are met. For example, when an input patch less than a threshold size is detected that can only correspond to one contact rather than two contacts, the disambiguation via machine learning can be bypassed. In such examples, at 1010, the input patch can be identified in the touch image meeting the minimum size criterion. When the input patch does not meet the size criterion (e.g., when the input patch is smaller than the threshold size), the subsequent processing may be skipped.

Although primarily described herein with examples of disambiguating between input patches from one or two contacts, it should be understood that the disambiguation could be for a different number of contacts. For example, the disambiguation can also output zero contacts (e.g., if the input patch identified in the sub-image is classified as unintended touch input from water, dirt, etc.). Additionally, the disambiguation may be used to disambiguate when more than two contacts are made (e.g., three or more contacts). In such examples, the size of the input patch may be increased (such that input sub-image corresponds to an area corresponding to three or more contacts). Additionally, when more than two contacts are estimated, more than two sub-image masks can be generated (e.g., three sub-image masks for three contacts, etc.).

Therefore, according to the above, some examples of the disclosure are directed to a method. The method can comprise identifying, in a touch image representative of signals measured at touch nodes of a touch-sensitive surface, an input patch corresponding to one or more objects proximate to a touch-sensitive surface; selecting a sub-image of the touch image corresponding to the input patch, the sub-image representative of the signals measured at a subset of the touch nodes of the touch-sensitive surface; and estimating, via a machine learning processing circuit receiving the sub-image as an input, whether the input patch included in the sub-image corresponds to one object or two objects. Additionally or alternatively to one or more of the examples disclosed above, in some examples, the method can further comprise: in accordance with an estimation that the input patch included in the sub-image corresponds to two objects, generating two sub-image masks. Each sub-image mask can correspond to one of the two objects. Additionally or alternatively to one or more of the examples disclosed above, in some examples, a size of each of the two sub-image masks can be equal to a size of the sub-image. Additionally or alternatively to one or more of the examples disclosed above, in some examples, a first sub-image mask of the two sub-image masks can include a first representation of whether touch is or is not detected at the subset of the touch nodes of the sub-image that is associated with a first object of the two objects, and a second sub-image mask of the two sub-image masks can include a second representation of whether touch is or is not detected at the subset of the touch nodes of the sub-image that is associated with a second object of the two objects. Additionally or alternatively to one or more of the examples disclosed above, in some examples, the first sub-image mask and the second sub-image mask can represent whether touch is or is not detected using binary values, such that each value represented in the first sub-image mask and the second sub-image mask is either a first value of the binary values or a second value of the binary values. Additionally or alternatively to one or more of the examples disclosed above, in some examples, the first representation and the second representation can be mutually exclusive such that each of the subset of the touch nodes of the sub-image at which touch is detected is associated with only one of the first object or the second object. Additionally or alternatively to one or more of the examples disclosed above, in some examples, each sub-image mask includes a representation of a contribution (e.g., a percentage) to touch signals detected at the subset of the touch nodes of the sub-image that is associated with a respective object. Additionally or alternatively to one or more of the examples disclosed above, in some examples, the method can further comprise: generating one sub-image mask, the one sub-image mask including a representation of whether touch is or is not detected at the subset of the touch nodes of the sub-image that is associated with the one object. Additionally or alternatively to one or more of the examples disclosed above, in some examples, the method can further comprise: in accordance with an estimation that the input patch included in the sub-image corresponds to two objects, dividing the input patch into two input patches using one or more ellipse parameters representing the input patch, the one or more ellipse parameters including at least one of a major axis parameter or a minor axis parameter. Additionally or alternatively to one or more of the examples disclosed above, in some examples, Additionally or alternatively to one or more of the examples disclosed above, in some examples, the machine learning processing circuit can comprise a convolutional neural network. Additionally or alternatively to one or more of the examples disclosed above, in some examples, the machine learning processing circuit can comprise a multi-layer convolutional neural network. Additionally or alternatively to one or more of the examples disclosed above, in some examples, the machine learning processing circuit can comprise at least one fully connected layer. Additionally or alternatively to one or more of the examples disclosed above, in some examples, the machine learning processing circuit can comprise a recurrent neural network. Additionally or alternatively to one or more of the examples disclosed above, in some examples, the method can further comprise: in accordance with a size of the input patch being less than a threshold size, determining that the input patch included in the sub-image corresponds to one object and bypassing estimating via the machine learning processing circuit. Additionally or alternatively to one or more of the examples disclosed above, in some examples, the machine learning processing circuit can output a probability that the input patch included in the sub-image corresponds to one object or two objects. When the probability indicative that the input patch corresponds to two object is above a threshold, the machine learning processing circuit can estimate that the input patch corresponds to two objects. When the probability indicative that the input patch corresponds to two objects is less than a threshold, the machine learning processing circuit can estimate that the input patch corresponds to one object. Additionally or alternatively to one or more of the examples disclosed above, in some examples, the machine learning processing circuit can output a probability distribution including a first probability value associated with one object and a second probability value associate with two objects. Estimating whether the input patch included in the sub-image corresponds to one object or two objects can comprise: estimating that the input patch corresponds to one object when the first probability value is greater than the second probability value; and estimating that the input patch corresponds to two object when the second probability value is greater than the first probability value. Some examples of the disclosure are directed to a non-transitory computer readable storage medium. The non-transitory computer readable storage medium can store instructions that when executed by an electronic device, can cause the electronic device to perform any of the above methods. Some examples of the disclosure are directed to an electronic device configured to perform any of the above methods.

Some examples of the disclosure are directed to a touch-sensitive device. The device can comprise: a plurality of touch electrodes; sensing circuitry configured to measure signals at the plurality of touch electrodes to generate a touch image, and processing circuitry. The signal-to-noise ratio (SNR) of the device can be less than a threshold SNR. The processing circuitry can be configured to detect a single input patch in the touch image corresponding to two objects contacting to the touch-sensitive device and within a threshold distance on the touch-sensitive device; and separate the single input patch into two input patches with greater than a threshold accuracy. Additionally or alternatively to one or more of the examples disclosed above, in some examples, the threshold accuracy can correspond to less than 10% false positives. Additionally or alternatively to one or more of the examples disclosed above, in some examples, the threshold accuracy can correspond to less than 20% false positives. Additionally or alternatively to one or more of the examples disclosed above, in some examples, the threshold distance can be between 10-18 mm. Additionally or alternatively to one or more of the examples disclosed above, in some examples, the threshold distance can be between 12-14 mm. Additionally or alternatively to one or more of the examples disclosed above, in some examples, the threshold SNR can be less than 5. Additionally or alternatively to one or more of the examples disclosed above, in some examples, the threshold SNR can be less than 4. Additionally or alternatively to one or more of the examples disclosed above, in some examples, the threshold SNR can be less than 3.

Some examples of the disclosure are directed to a method. The method can comprise: identifying, in a touch image representative of signals measured at touch nodes of a touch-sensitive surface, an input patch corresponding to one or more objects proximate to a touch-sensitive surface; selecting a sub-image of the touch image corresponding to the input patch, the sub-image representative of the signals measured at a subset of the touch nodes of the touch-sensitive surface; and estimating, via a machine learning processing circuit receiving the sub-image as an input, a number of the one or more objects corresponding to the input patch included in the sub-image. Additionally or alternatively to one or more of the examples disclosed above, in some examples, the method can further comprise: in accordance with an estimation that the number of objects corresponding to the input patch included in the sub-image is two or greater, generating a number of sub-image masks corresponding to the number of the one or more objects. Each sub-image mask can correspond to one of the one or more objects. Additionally or alternatively to one or more of the examples disclosed above, in some examples, a size of each of the sub-image masks can be equal to a size of the sub-image. Additionally or alternatively to one or more of the examples disclosed above, in some examples, each of the sub-image masks can include a representation of whether touch is or is not detected at the subset of the touch nodes of the sub-image that is associated with a respective object of the one or more objects. Additionally or alternatively to one or more of the examples disclosed above, in some examples, each of the sub-image masks can represent whether touch is or is not detected using binary values, such that each value represented in the sub-image masks is either a first value of the binary values or a second value of the binary values. Additionally or alternatively to one or more of the examples disclosed above, in some examples, the sub-image masks are mutually exclusive such that each of the subset of the touch nodes of the sub-image at which touch is detected is associated with only one respective object. Additionally or alternatively to one or more of the examples disclosed above, in some examples, the method can further comprise: in accordance with an estimation that the number of objects corresponding to the input patch included in the sub-image is one, generating one sub-image mask, the one sub-image mask including a representation of whether touch is or is not detected at the subset of the touch nodes of the sub-image that is associated with the one object. Additionally or alternatively to one or more of the examples disclosed above, in some examples, the method can further comprise: generating a number of sub-image masks corresponding to the number of the one or more objects. Each sub-image mask can correspond to one of the one or more objects. Each sub-image mask can include a representation of a contribution to touch signals detected at the subset of the touch nodes of the sub-image that is associated with a respective object of the one or more objects. Additionally or alternatively to one or more of the examples disclosed above, in some examples, the machine learning processing circuit can comprise a convolutional neural network. Additionally or alternatively to one or more of the examples disclosed above, in some examples, the machine learning processing circuit can comprise a multilayer convolutional neural network. Additionally or alternatively to one or more of the examples disclosed above, in some examples, the machine learning processing circuit can comprise at least one fully connected layer. Additionally or alternatively to one or more of the examples disclosed above, in some examples, the machine learning processing circuit can comprise a recurrent neural network. Additionally or alternatively to one or more of the examples disclosed above, in some examples, the method can further comprise: in accordance with a size of the input patch being less than a threshold size, determining that the input patch included in the sub-image corresponds to one object and bypassing estimating via the machine learning processing circuit. Additionally or alternatively to one or more of the examples disclosed above, in some examples, the machine learning processing circuit can output a probability distribution. The number of the one or more objects corresponding to the input patch can be estimated as a number with a highest probability value in the probability distribution. Some examples of the disclosure are directed to a non-transitory computer readable storage medium. The non-transitory computer readable storage medium can store instructions that when executed by an electronic device, can cause the electronic device to perform any of the above methods. Some examples of the disclosure are directed to an electronic device configured to perform any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch-sensitive device comprising:
a plurality of touch electrodes;
sensing circuitry configured to measure signals at the plurality of touch electrodes to generate a touch image, wherein a signal-to-noise ratio (SNR) for measurement of the signals is less than a threshold SNR; and
processing circuitry configured to:
detect a single input patch in the touch image corresponding to two objects contacting the touch-sensitive device and the two objects within a threshold distance of one another on the touch-sensitive device; and
separate the single input patch into two input patches with greater than a threshold accuracy.

2. The touch-sensitive device of claim 1, wherein the threshold accuracy corresponds to less than 10% false positives.

3. The touch-sensitive device of claim 1, wherein the threshold accuracy corresponds to less than 20% false positives.

4. The touch-sensitive device of claim 1, wherein the threshold distance is between 10-18 mm.

5. The touch-sensitive device of claim 1, wherein the threshold distance is between 12-14 mm.

6. The touch-sensitive device of claim 1, wherein the threshold SNR is less than 5.

7. The touch-sensitive device of claim 1, wherein the processing circuitry comprises a convolutional neural network.

8. The touch-sensitive device of claim 1, wherein the processing circuitry comprises a recurrent neural network.

9. The touch-sensitive device of claim 1, wherein the processing circuitry comprises a multilayer convolutional neural network and at least one fully connected layer.

10. The touch-sensitive device of claim 1, the processing circuitry further configured to:
generate two sub-image masks, wherein each sub-image mask corresponds to one of the two objects.

11. The touch-sensitive device of claim 10, wherein a first sub-image mask of the two sub-image masks includes a first representation of whether touch is or is not detected at a subset of touch nodes of the touch image including the single input patch that is associated with a first object of the two objects, and wherein a second sub-image mask of the two sub-image masks includes a second representation of whether touch is or is not detected at a subset of the touch nodes of the touch image including the single input patch that is associated with a second object of the two objects.

12. The touch-sensitive device of claim 11, wherein the first sub-image mask and the second sub-image mask represent whether touch is or is not detected using binary values, such that each value represented in the first sub-image mask and the second sub-image mask is either a first value of the binary values or a second value of the binary values.

13. The touch-sensitive device of claim 11, wherein the first representation and the second representation are mutually exclusive such that each of the subset of the touch nodes of the single input patch at which touch is detected is associated with only one of the first object or the second object.

14. The touch-sensitive device of claim 10, further comprising separating the single input patch into the two input patches using one or more ellipse parameters representing the single input patch, the one or more ellipse parameters including at least one of a major axis parameter or a minor axis parameter.

15. A method comprising:
measuring signals at a plurality of touch electrodes of a touch-sensitive device to generate a touch image, wherein a signal-to-noise ratio (SNR) for measurement of the signals is less than a threshold SNR;
detecting a single input patch in the touch image corresponding to two objects contacting the touch-sensitive device and the two objects within a threshold distance of one another on the touch-sensitive device; and
separating the single input patch into two input patches with greater than a threshold accuracy.

16. The method of claim 15, wherein the threshold accuracy corresponds to less than 10% false positives.

17. The method of claim 15, wherein the threshold accuracy corresponds to less than 20% false positives.

18. The method of claim 15, wherein the threshold distance is between 10-18 mm.

19. The method of claim 15, wherein the threshold distance is between 12-14 mm.

20. The method of claim 15, wherein the threshold SNR is less than 5.

21. A non-transitory computer readable storage medium storing instructions that when executed by a touch-sensitive device, cause the touch-sensitive device to perform a method, the method comprising:
measuring signals at a plurality of touch electrodes of the touch-sensitive device to generate a touch image, wherein a signal-to-noise ratio (SNR) for measurement of the signals is less than a threshold SNR;
detecting a single input patch in the touch image corresponding to two objects contacting the touch-sensitive device and the two objects within a threshold distance of one another on the touch-sensitive device; and
separating the single input patch into two input patches with greater than a threshold accuracy.

* * * * *